United States Patent [19]
Fuchs

[11] 3,941,869
[45] Mar. 2, 1976

[54] PROCESS FOR EXOTHERMIC REACTIONS

[76] Inventor: Warren Fuchs, 107 Cherry Lane, Laurel Hollow, Syosset, L. I., N.Y. 11791

[22] Filed: May 23, 1972

[21] Appl. No.: 256,117

[52] U.S. Cl. ............... 423/239; 423/359; 423/360; 423/361; 423/533; 423/659; 260/449.5; 23/288 R; 23/288 K

[51] Int. Cl.² B01J 8/00; C01B 22/00; C07C 29/16; C01C 1/04

[58] Field of Search ........... 423/362, 235, 239, 659, 423/212, 213.5, 359, 360, 361, 532, 533, 535; 260/449.5; 23/288 K

[56] References Cited
UNITED STATES PATENTS

| | | | |
|---|---|---|---|
| 1,909,442 | 5/1933 | Williams | 423/362 |
| 2,301,044 | 11/1942 | Heard et al. | 23/288 R |
| 2,548,015 | 4/1951 | Goodson et al. | 23/288 R |
| 2,970,034 | 1/1961 | Andersen et al. | 423/219 |
| 3,002,816 | 10/1961 | Friend et al. | 260/449.5 |
| 3,366,461 | 1/1968 | Christensen | 23/289 |
| 3,402,015 | 9/1968 | Hardison et al. | 423/239 |
| 3,443,910 | 5/1969 | Newman et al. | 423/239 |
| 3,459,511 | 8/1969 | Jotoku et al. | 23/289 |
| 3,467,492 | 9/1969 | Newman | 423/239 |
| 3,498,752 | 3/1970 | Kuo | 23/289 |
| 3,567,367 | 3/1971 | Kandell et al. | 423/239 |

Primary Examiner—Oscar R. Vertiz
Assistant Examiner—Brian E. Hearn

[57] ABSTRACT

Exothermic reaction of a fluid stream is carried out with recycle and addition of hot reacted fluid to the colder feed fluid stream, so as to raise the feed fluid stream to operable reaction temperatures and produce optimum reaction rate. The addition of hot reacted fluid is carried out by reactor-internal ejector-effected aspiration of a portion of the hot reacted fluid discharged from the reaction zone into the cold feed fluid. The resulting combined fluid stream is passed to the reaction zone. The balance of the hot reacted fluid not aspirated into the cold feed fluid is passed to product recovery or utilization. The invention is especially applicable to exothermic catalytic reactions.

8 Claims, 8 Drawing Figures

PROCESS FOR EXOTHERMIC REACTIONS

BACKGROUND OF THE INVENTION

1. Field of the Invention

The invention relates to processes which entail an exothermic reaction of a fluid process stream, and is especially applicable to exothermic catalytic reactions such as the oxidation of sulfur dioxide to sulfur trioxide, ammonia or methanol synthesis, or the catalytic elimination of residual nitrogen oxides from the tail gas discharged from nitric acid production by reaction of the nitrogen oxides with a reducing gas such as methane or hydrogen. In these various and similar reactions, the cold feed gas must be heated to a suitable ignition temperature to initiate the reaction, and excessively high reaction temperatures must be avoided.

2. Description of the Prior Art

The use of ejectors or aspirators for recycling and mixing in various processes is described in Gillespie, G. R. et al "Catalytic Purification of Nitric Acid Tail Gas" AIChE Meeting (Dec. 2, 1971) page 8 and FIG. 7 and in Kirk-Othmer "Encyclopedia of Chemical Technology" Interscience-Wiley (1964) Edition-2, Volume-4, pages 410–412 and in Foster Wheeler Corp. Bulletin 0–54–1 (1954) pages 8 and 9. The general prior art practice with respect to ejectors or aspirators for recycling and mixing in conjunction with exothermic reactions has been to pass the effluent stream from the immediate reaction zone to a zone or zones where cooling at least in part is effected either purposefully and desirably as in cases to obtain product condensation and removal as in the Foster Wheeler reference, or again purposefully and desirably as in cases to obtain process requisite heat transfer as in the Kirk-Othmer reference, or involuntarily and undesirably as in cases of thermal losses to ambient as resulting from the Gillespie et al method of application. All of the referenced prior art practices are accompanied furthermore by relatively long flow path and significant pressure loss.

The use of fans or blowers for recycling and mixing in various processes is described in Nonhebel, G. "Gas Purification Processes," George Newnes Ltd. (1964) pages 432, 450, 451 and in Kohl & Riesenfeld "Gas Purification," McGraw Hill Inc. (1960) pages 473 and 479. The general prior art practice with respect to fans or blowers for recycling and mixing in conjunction with exothermic reactions has been limited in application according to temperature and pressure restrictions for the fans or blowers and to the unavoidably cumbersome nature of such installations.

Apparatus for exothermic catalytic reactions is described in U.S. Pat. Nos. 3,498,752; 3,475,137; 3,443,910; 3,433,600; 3,366,461; 3,366,460; 3,212,862 and 3,041,151. Processes for elimination of nitrogen oxides from nitric acid plant tail gas are described in U.S. Pat. Nos. 3,565,575; 3,467,492; 2,970,034 and 3,443,910. Improvements in catalytic methanol synthesis are disclosed in U.S. Pat. Nos. 3,597,465; 3,531,266 and 3,186,145, and improvements in catalytic ammonia synthesis are described in U.S. Pat. Nos. 3,349,569 and 3,232,707.

Sulfuric acid process improvements are described in U.S. Pat. Nos. 3,653,828; 3,536,446; 3,519,388; 3,475,120; 3,455,652; 3,434,263; 3,350,169; 3,172,725 and 3,147,074. Nitric acid production or analogous processing is described in U.S. Pat. Nos. 3,542,510; 3,499,734 and 3,102,788.

SUMMARY OF THE INVENTION

In the present invention, typically as applied to an exothermic reaction, the hot reacted fluid discharged from the reaction zone is divided into two portions. A first portion of the hot reacted fluid is utilized to heat the cold feed fluid to optimum reaction temperature or to ignition temperature, by immediate to reaction zone, reactor-internal, ejector-effected aspiration of the first reacted fluid portion into the cold feed fluid stream, so as to minimize thermal and pressure losses while heating the feed fluid and providing a combined fluid stream at optimum temperature for initiation or attainment of the exothermic reaction. The combined fluid stream is then passed to the reaction zone. The second portion of the hot reacted fluid stream is passed to product utilization.

In a preferred embodiment, the process fluid is gaseous and the reaction zone is catalytic, such as a bed of solid catalyst particles or a honeycomb element, and an exothermic catalytic reaction takes place between components in the gaseous process stream within the reaction zone, so that a gaseous product component is formed and discharged in the hot reacted gas stream. Thus, the process of the present invention is especially applicable to exothermic catalytic reactions such as ammonia or methanol synthesis, elimination of nitrogen oxides from the tail gas of a nitric acid production process by catalytic reaction with reducing gas, or the catalytic oxidation of sulfur dioxide to sulfur trioxide in sulfuric acid manufacturing processes. In the latter instance, the present process is particularly applicable when the sulfur dioxide-containing gas stream is derived from metallurgical processing such as sulfide ores or concentrates or mattes roasting or smelting or converting, in the usual practice of which the initial gas stream is a low temperature due to scrubbing with water or the like for removal of entrained dust particles.

The key advantages of the system derive from the shortening of the heretofore fixed and controlling lengths of conventional equilibrium-plot temperature versus conversion lines. The shortening is directly proportional to the ratio of makeup gas to recycle plus makeup. For a 2/1 recycle to makeup ratio the shortening is therefore to one-third of original length. The result is a valuable tool opening previously unavailable options for optimizing the straddle between slow reaction rates at kindling temperature on the low side and catalyst or equilibrium over-temperature limitations on the high side. For cases in which the feed gases are initially colder than kindling temperature the expanded options apply also to reductions in heat exchanger requirements for feed-gas preheating.

It is an object of the present invention to provide an improved process and apparatus for carrying out exothermic reactions.

Another object is to provide improvements in process and apparatus for exothermic catalytic reactions such as ammonia or methanol synthesis, sulfur dioxide oxidation and the elimination of nitrogen oxides from nitric acid plant tail gases by reaction with reducing gas.

A further object is to provide an improvement in the recycling of hot reacted fluid from a reaction zone into cold feed fluid to the reaction zone by means of an integral reaction-vessel-contained ejector-effected aspirator.

An additional object is to heat cold feed fluid to a catalysis zone for exothermic catalytic reaction in an improved manner.

Still another object is to utilize, immediate to an exothermal reaction zone and minimizing thermal and pressure losses, a portion of the hot reacted fluid from such reaction zone to heat cold feed fluid to said zone in an improved process and apparatus.

These and other objects and advantages of the present invention will become evident from the description which follows:

DESCRIPTION OF THE DRAWINGS AND PREFERRED EMBODIMENTS

Referring now to the drawings, typical arrangements of application of the present invention to an exothermic catalytic reaction are illustrated.

Figure 1:
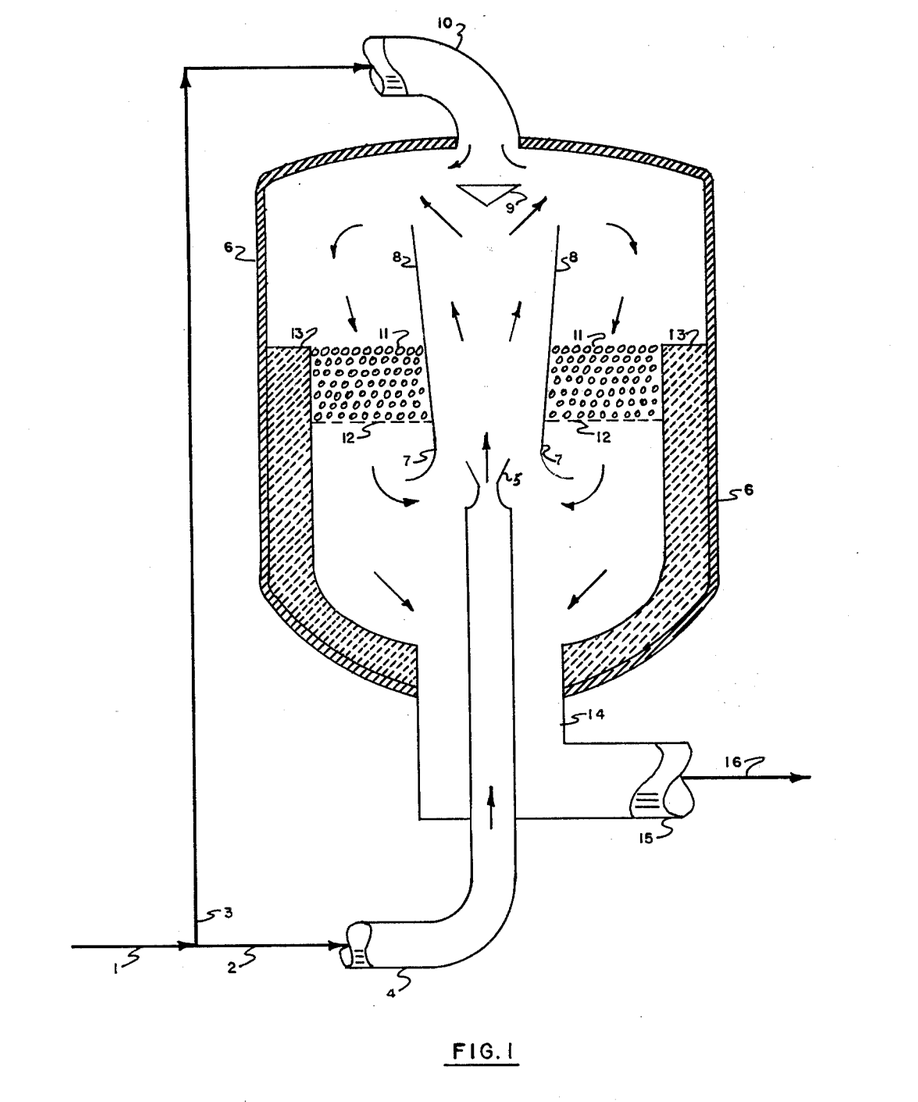
FIGS. 1–4 inclusive and FIG. 6 are sectional elevation views showing alternative arrangements of a catalytic converter and appurtenances thereto.

Referring now to FIG. 1, stream 1 is a fluid stream, typically a gaseous stream, which is to be subjected to an exothermic catalytic reaction. Stream 1 may be an oxygen and sulfur dioxide-containing gas stream, typically derived from metallurgical processing as a cold gas stream having a temperature in the range of 40°C, which is to be heated to initial catalysis temperature of about 550°C. Alternatively, stream 1 may be the tail gas from a nitric acid production facility to which reducing gas has been added, in which case stream 1 will be subject to catalysis for the elimination of nitrogen oxides. Stream 1 may also be a synthesis gas, such as an ammonia synthesis gas having approximately 3:1 molar ratio of hydrogen to nitrogen, in which case stream 1 will be subjected to catalysis for ammonia synthesis, or a methanol synthesis gas containing hydrogen and carbon oxides and suitable for catalytic methanol synthesis.

Stream 1 may be divided into main feed stream 2 and by-pass stream 3. Stream 2 passes via inlet pipe 4 vertically upwards into the constricted throat element 5 of the centrally oriented aspirator or inductor which is disposed centrally within the generally vertically oriented cylindrical container or reactor 6. The curved annular aspirator element 7 is spaced from and mounted about element 5, so as to provide an annular passage between central element 5 and element 7 for aspiration or induction of a portion of the previously reacted hot fluid stream into the cold feed stream 2. The aspirated reacted fluid portion is drawn inwards and upwards by the aspirator action of the cold feed stream discharged upwards from element 5, and a combined stream flows upwards from section 7 into the flared or outwardly tapered central gas passage pipe 8, which may be in some instances of constant dimension but is generally of inverted frusto-conical configuration.

Pipe 8 serves to conduct the heated combined fluid stream upwards into the upper section of container 6, and an inverted conical central baffle 9 may be provided at or above the upper discharge end of pipe 8 to disperse the combined fluid stream outwards. The combined fluid stream flowing upwards within pipe 8 is now generally of a suitable temperature for the initiation of catalysis, however in some instances the combined fluid stream may be at a somewhat higher temperature than the optimum level. In this case, stream 3 passes via inlet pipe 10 into the top of container 6 and is dispersed into the combined fluid stream discharged from pipe 8. The flow rate of stream 3 is generally regulated by a flow control valve, not shown, which is adjusted by a temperature sensor such as a pneumatic element or a thermocouple which extends into the upper portion of unit 6, so that the temperature of the final combined fluid stream is maintained at an optimum level for the initiation of catalysis.

The resulting final combined fluid stream now flows downwards into the annular catalyst bed 11 and an exothermic catalytic reaction of the fluid stream takes place within bed 11, which generally consists of a plurality of discrete particles of a carrier material having a suitable catalytic agent for the desired reaction deposited on the particles. The particles within bed 11 may be of a porous nature in which case a portion of the active catalytic agent will be absorbed within the pores of the particles. In other instances bed 11 may in practice consist of an annular honeycomb element or the like composed of a suitable refractory material, with the active catalytic agent being deposited on the surfaces of the parallel vertical passages of the honeycomb.

Bed 11 is supported on the foraminous grid or grate 12, and elements 11 and 12 extend outwards from pipe 8 to a layer 13 of refractory material which is provided on the lower inner surface of container 6 in order to protect the container 6 from excessive temperatures. The hot reacted fluid flowing downwards below element 12 now divides into a recycle portion which is separated or inducted into the cold feed fluid as described supra, and a final reacted fluid portion containing the product of the catalytic reaction which flows downwards out of container 6 via lower central outlet pipe 14 which is concentrically spaced about central pipe 4. The hot product fluid stream flow downwards in the annular passage between central pipe 4 and pipe 14, and is removed via pipe 15 as stream 16 which is passed to suitable product recovery or further processing as desired.

Figure 2:
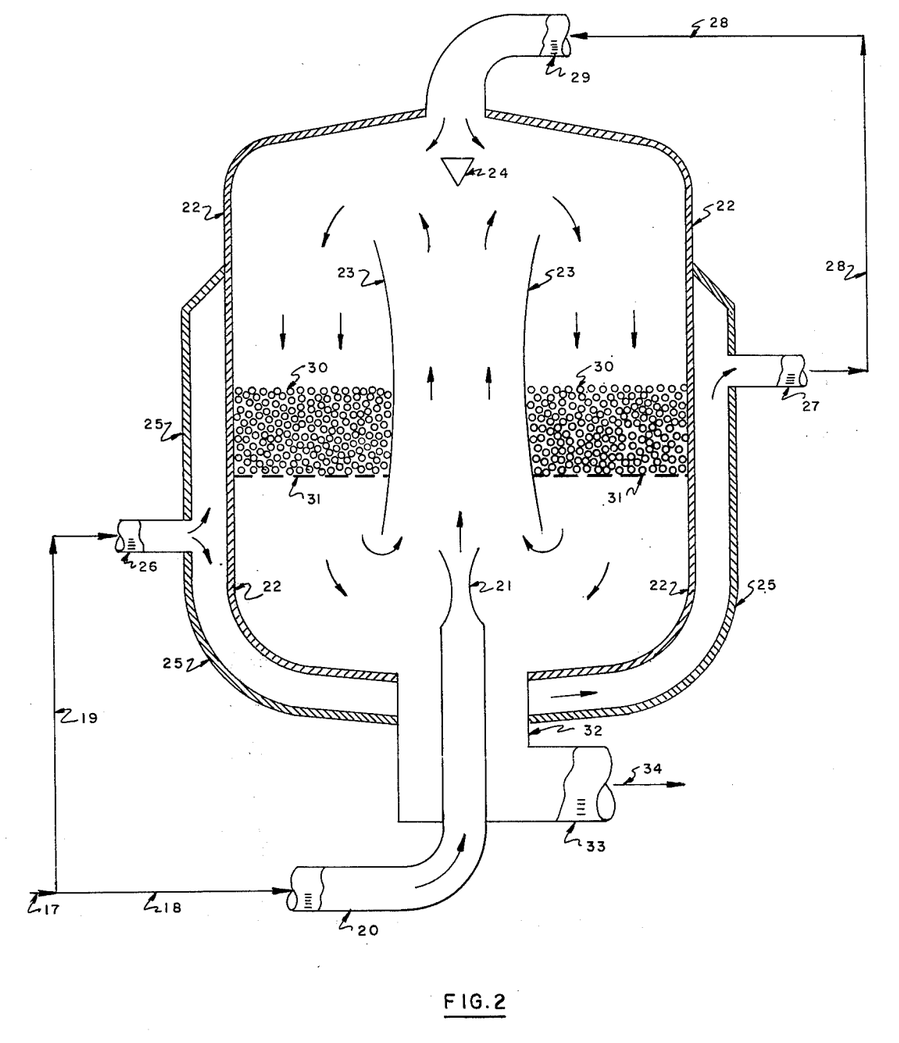

Referring now to FIG. 2, an arrangement similar to FIG. 1 is shown, except that an alternative expedient is provided to insulate the hot reacted fluid stream and to cool the lower portion of the reaction container. Cold feed stream 17 is divided into main feed stream 18 and bypass stream 19. Stream 18 flows via pipe 20 into central aspirator element 21, which is centrally oriented within container 22 and constricts the flow of the cold feed gas to provide high velocity and an aspiration effect. The high velocity feed gas is discharged into the generally flared outlet pipe 23 which may be of coned or arcuate vertical section, and hot reacted fluid is aspirated or inducted into the cold feed fluid within pipe 23. An inverted conical baffle 24 is preferably provided at the upper end of pipe 23, to distribute the hot combined fluid stream.

An insulating jacket 25 is provided about the lower portion of container 22. The jacket 25 is spaced from the outer wall of container 22 so as to provide an annular passage for flow of the bypass cold feed fluid stream 19, which is admitted into the annular flow passage via inlet pipe 26. The cold feed stream 19 circulates in the space between jacket 25 and container 22 and thereby provides a cooling and insulating effect. The resulting warmed feed fluid is removed from jacket 25 via outlet pipe 27 as stream 28, which flows via pipe 29 into the upper end of container 22 and is added to the combined fluid stream discharged upwards and outwards from pipe 23. The total combined fluid stream flows downwards through catalyst bed 30 which is supported on grate 31, and an exothermic catalytic reaction takes place within bed 30. The hot reacted fluid discharged below element 31 divides into a recycle portion which flows inwards around the lower end of pipe 23 and is aspirated into the cold feed fluid, and a hot product portion which flows downwards from the container 22 via the annular passage between pipe 20 and pipe 32 for discharge via pipe 33 as stream 34.

Figure 3:
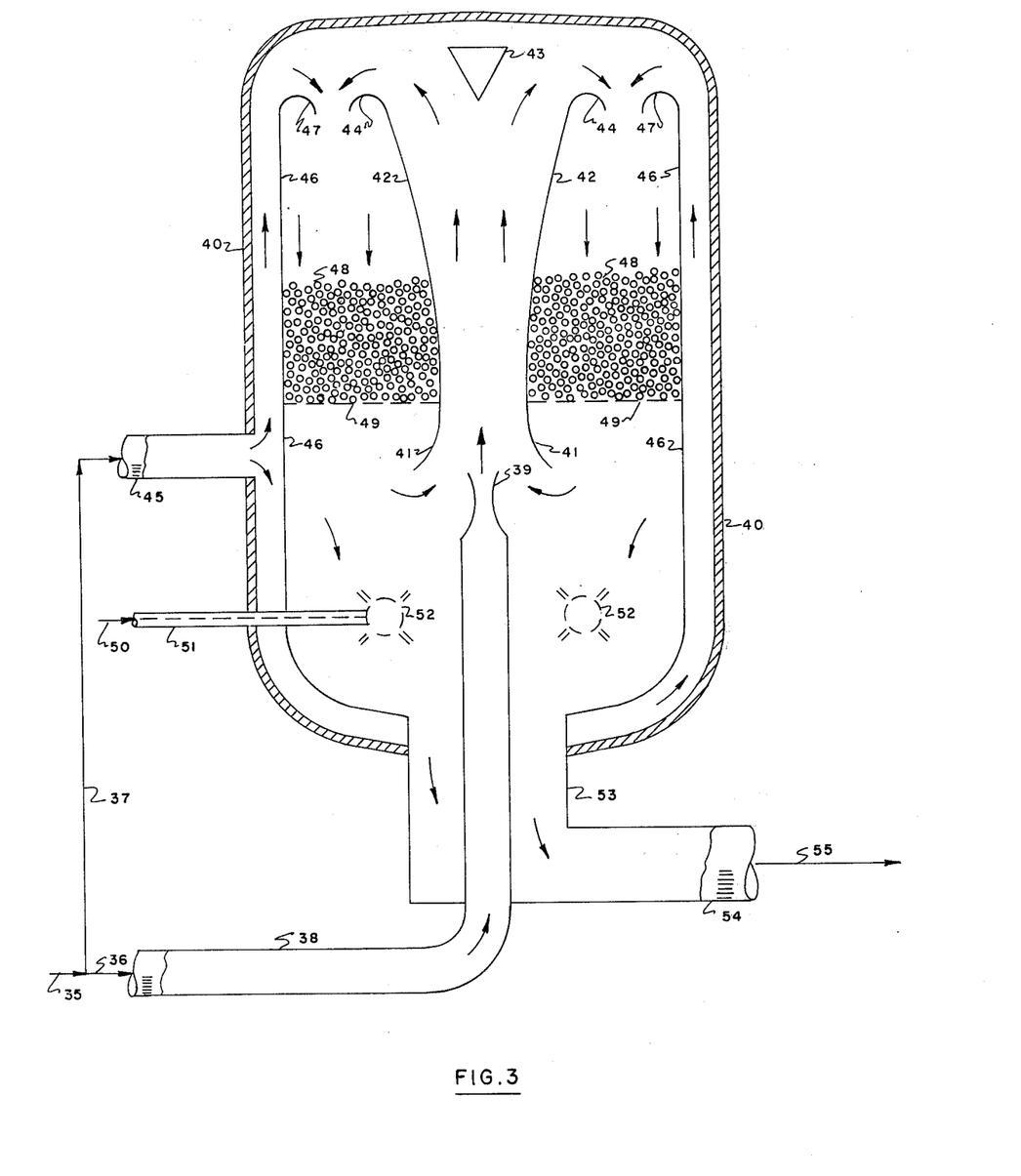

Referring now to FIG. 3, a configuration similar to FIG. 2 is presented, except that internal annular cooling is provided as well as a lower quench for cooling product reacted fluid. Cold feed stream 35 is divided into the main feed stream 36 and bypass feed stream 37. Stream 36 flows via pipe 38 upwards to constricted aspiration flow passage unit 39, which is centrally located within container 40. Aspirator nozzle or ejector 39 cooperates with the curved annular aspirator element 41 to induct hot reacted fluid into the cold feed stream. The resultant warmed combined stream flows upwards through the generally inverted frusto-conical pipe or duct 42, with upper inverted conical baffle being provided for annular flow diversion. A curved upper lip 44 is preferably provided at the upper end of element 42 in order to reduce fluid turbulence.

The cold bypass fluid stream 37 flows via inlet pipe 45 into the annular passage defined between the generally cylindrical container 40 and inner cylindrical baffle or plate 46, so that the circulation of cold bypass fluid between elements 40 and 46 serves to cool the container 40 in which the exothermic catalytic reaction takes place. This arrangement is especially desirable when the reaction is carried out at elevated pressure. The circulating cold bypass fluid is warmed between elements 40 and 46, and flows upwards and over the top of curved lip 47 which is provided at the upper end of element 46 to reduce fluid turbulence.

The warmed bypass fluid thus joins the main combined fluid stream at the upper end of container 40, and the total combined fluid stream next flows downwards in the annular passage between central pipe 42 and cylindrical baffle 46 and then through the annular catalyst bed 48 which is supported on grid or grate 49 and extends between elements 41 or 42 and baffle 46. An exothermic catalytic reaction of the combined fluid stream takes place in bed 48. The hot reacted fluid stream discharged below grid 49 now divides into recycle portion which is aspirated inwards below element 41 and upwards between elements 39 and 41 as described supra, and a product reacted fluid stream which flows downwards within baffle 46. The hot product stream is now quenched in situ within container 40. Quench fluid stream 50, which may in suitable instances consist of a liquid such as water or a condensed reaction product such as ammonia or methanol, is passed via pipe 51 to the foraminous hollow circular quench member 52, which is concentrically disposed in the lower portion of vessel 40 within member 46 and which sprays quench fluid into the hot product reacted fluid stream, in order to provide a cooling effect. The fooled product fluid stream next flows downwards in the annular passage between central pipe 38 and pipe 53, and passes to product recovery or other utilization via pipe 54 as stream 55.

Figure 4:
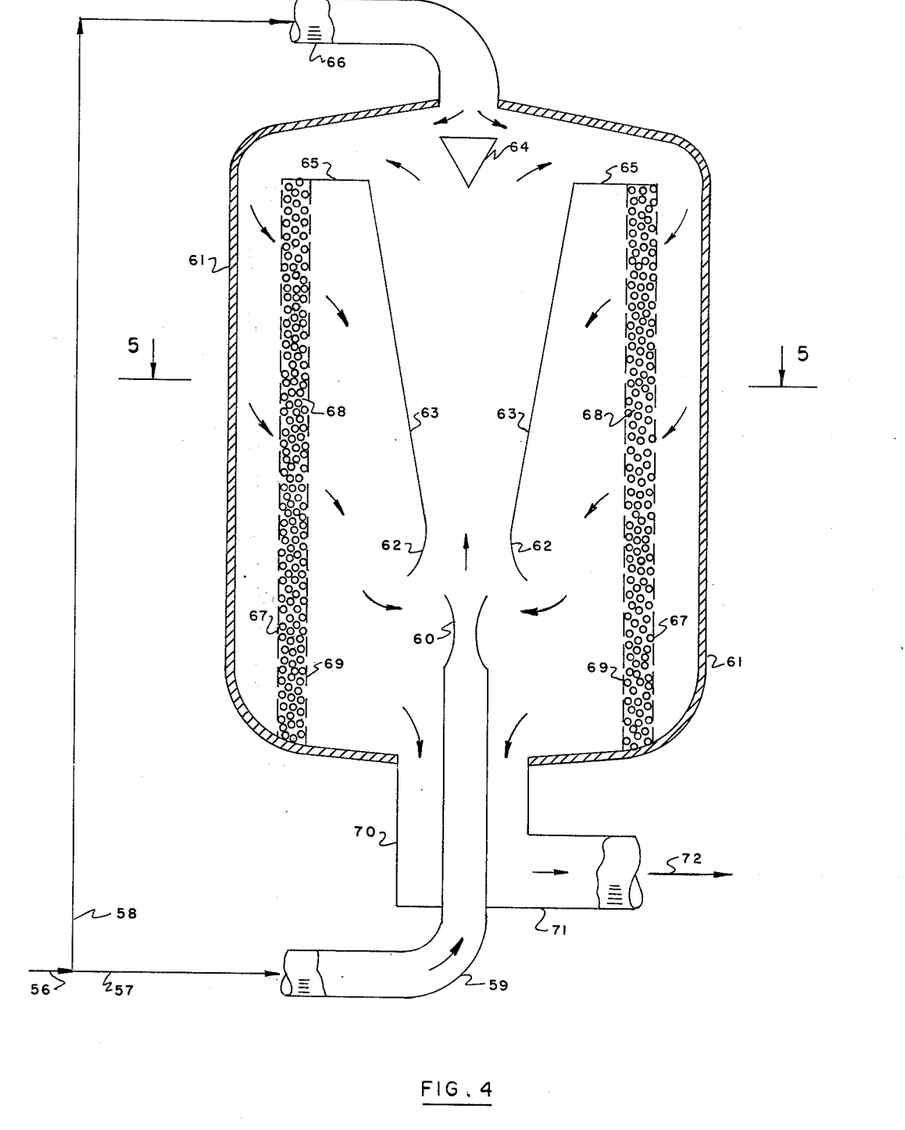

Referring now to FIG. 4, an alternate integral configuration is provided, to attain vessel wall cooling as well as radial inward flow through an annular bed, which permits the provision of a longer diffuser and better mixing. Cold feed stream 56 is divided into the main feed stream 57 and bypass stream 58. Stream 57 flows via central pipe 59 into aspiration element 60, from which the cold feed fluid is discharged upwards at high velocity. Nozzle element 60 is centrally oriented within the generally vertically oriented cylindrical reaction vessel 61. Element 60 cooperates with the flared aspirator inlet element 62, so that hot reacted fluid is aspirated or inducted into the cold feed fluid and a combined fluid stream at intermediate temperature flows upwards through the inverted frusto-conical pipe 63, which extends upwards to the upper end of the vessel 61. An inverted conical baffle 64 is provided adjacent to the upper outlet of pipe 63 to divert the combined fluid stream laterally outwards above the flat horizontal ring-shaped baffle 65.

The cold bypass feed fluid stream 58 is passed via upper pipe 66 into the upper end of the vessel 61 and combines with the main process stream above baffle 65 to provide a quench-cooling effect. The resultant total combined fluid stream now flows downwards between the inner wall of vessel 61 and the generally vertically oriented foraminous support baffle 67, which extends downwards from baffle 65 to the bottom of vessel 61. The process fluid stream flows radially inwards through the plurality of openings in baffle 67 and through the vertically oriented generally cylindrical catalyst bed 68 which is disposed between baffle 67 and inner foraminous cylindrical baffle 69, which also extends vertically between upper baffle 65 and the bottom of container 61 and which is generally parallel to baffle 67.

The hot reacted fluid flowing radially inwards from baffle 69 is diverted downwards by pipe 63, and flows towards the lower end of the container 61 between baffle 69 and pipe 63. A portion of the hot reacted fluid is aspirated inwards below element 62 and into the cold feed fluid as described supra. The balance of the hot reacted fluid containing product is passed downwards between central pipe 59 and pipe 70 and is withdrawn via pipe 71 as stream 72.

Figure 5:
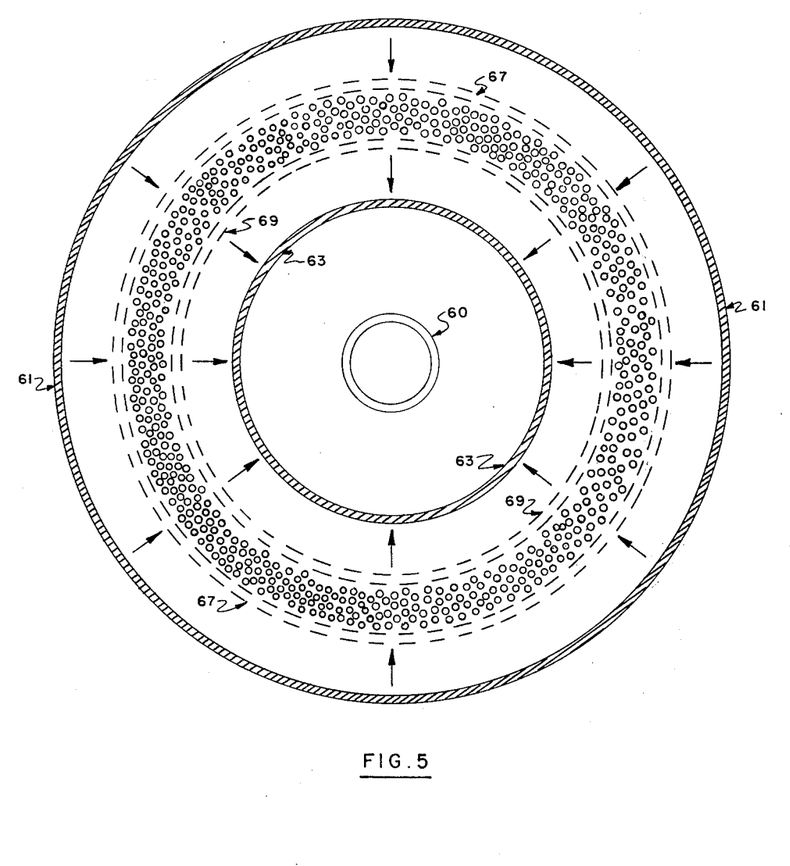
FIG. 5 is a sectional plan view of the cylindrical converter shown in FIG. 4.

FIG. 5 is a sectional plan view of FIG. 4 taken on section 5—5, and shows the concentric coaxial arrangement of the several apparatus elements such as elements 60, 63, 69, 67 and 61, as well as the radial inward flow of the process fluid stream.

Figure 6:
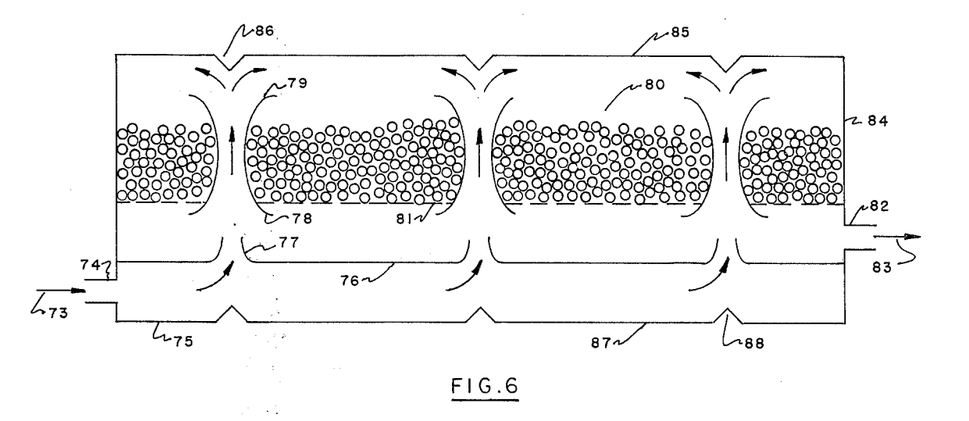

Referring now to FIG. 6, a multiple integral configuration is provided as may be desirable for larger capacity units or for savings in height for "flat" configurations. Cold stream 73 is admitted through an inlet nozzle 74 to plenum chamber 75 with upper surface 76. The upper surface 76 is perforate and has formed from or assembled to its respective openings a corresponding multiplicity of constricted throat elements 77. The lower surface 87 may have formed from it or assembled with it a multiplicity of flow enhancers 8 coordinate to the respective throat elements 77.

The constricted throat elements 77 cooperate with a multiplicity of curved annular aspirator elements 78. The cold feed 73 divides between the multiplicity of throat elements 77 and inducts hot reacted fluid on passing into the corresponding multiplicity of aspirator elements 78. The resultant multiplicity of warmed combined streams flow upwards through the generally inverted frusto-conical diffusers 79 and then downward through catalyst bed 80 which is supported on grate 81, and an exothermic catalytic reaction takes place within bed 80. The hot reacted fluid discharged below element 81 divides into a multiplicity of recycle portions which flow inwards around the lower ends of aspirator elements 78 into the respective cold feed fluid streams issuing from the multiplicity of throat elements 77, and a hot product portion which flows outward for discharge via pipe 82 as stream 83.

The overall assembly 84 may be provided as an independent vertical-axis cylindrical vessel with flat or formed heads or may be provided as a vertical-axis cylindrical section of a taller vertical-axis cylindrical vessel made up of more than one such section. The top surface 85 of the section or assembly may have formed from it or arranged with it or arranged with the diffusers 79 a multiplicity of flow diverters 86 cooperating with said diffusers 79.

Numerous alternatives within the scope of the present invention will occur to those skilled in the art. The invention is generally applicable to exothermic reactions in general, however the invention is especially applicable to catalytic reactions which are exothermic and which may be carried out in the gaseous or liquid phases. Typical catalytic reactions to which the invention is applicable have been mentioned supra, however the invention is also applicable to other catalytic reactions which are exothermic such as the water gas shift reaction between carbon monoxide and steam to produce hydrogen and carbon dioxide or catalytic methanation of oxides of carbon with hydrogen or automobile tail gas reactions. Numerous other suitable catalytic reactions will occur to those skilled in the art. In instances such as the processing of nitric acid plant tail gas to eliminate nitrogen oxides by reaction with reducing gas, the final hot product reacted gas stream may be discharged to atmosphere, usually after expansion through a gas turbine for power recovery. The container or reaction vessel 6, 22, 40 or 61 is preferably a vertically oriented cylindrical vessel, however other configurations known to the art may be provided in practice. In some instances streams 3, 19, 37 or 58; and/or baffles 9, 24, 43 or 64 may be omitted in practice. In instances when a catalytic reaction is being practiced, a suitable catalyst for the particular reaction will be provided, such as the catalytic agents and formulations mentioned in the patents enumerated supra, and the active catalytic agent will usually be deposited on a suitable carrier which may be in a spherical, cubic, prismatic pellet or honeycomb form. The container vessels may be of oblong or other forms as well as cylindrical and with internal configurations to suit. Orientations may be according to the respective FIGS. 1–6 or may be of generally upside-down or opposite or otherwise suitable arrangement. The invention is also applicable to a catalytic reaction in which catalysis is carried out in a plurality of catalyst beds in series, in which case the invention may be applied to one, several or all of the catalyst beds.

An example of application of the present invention to the cold gas produced in a metallurgical facility and containing sulfur dioxide and oxygen, which is to be heated processed for the catalytic production of sulfur trioxide, will now be described.

It may be observed that the invention in its maximized retention of reaction heat is operating in a manner that is normally considered quite undesirable to exothermic catalytic processes, and furthermore and even surprisingly as compared to conventional concepts has been found to be of benefit to and has been utilized to improve the respective overall systems.

EXAMPLE I

The invention was applied in computation model to a cold gas from copper converting containing about 7% $SO_2$, 12% $O_2$, 81% $N_2$. A modelling procedure was utilized approximately parallel to the computation methods and references of Calderbank, P. H. "Contact Process Converter Design" CEP Nov. 53 pages 585–590. The first catalyst bed only was considered. A recycle ratio (recycle-gas/make-up-gas) of 2/1 was taken arbitrarily for the pre-optimization sample. The approach to equilibrium at the bed outlet was taken arbitrarily at 60°F and was considered for both a zero recycle and a 2/1 recycle case. The results may be considered in terms of comparison of conversion obtainable in the first bed, and of heat exchanger requirements for preheat of the feed gas to the first bed. For approximately identical quantity of first bed catalyst in both cases, the conversion is in the range of 10% higher for the recycle system, and therefore providing as well savings to subsequent stage catalyst requirements. In addition, the preheating thermal requirements are in the range of 20 % less for the recycle system and the exchanger surface in the range of 30% less. Following is a summary of data relative to the improved results.

| Conversion Data | | Conventional Operation | Recycle 2/1 |
|---|---|---|---|
| Make-up to Catalyst | % $SO_2$ | 7.00 | 7.00 |
| Recycle/Make-up | (1) | 0 | 2/1 |
| Conversion Ex. Cat. | (2) | 72.0 | 82.0 |
| Gas Ex. Catalyst | M—$SO_3$ | 5.04 | 5.74 |
| Gas Ex. Catalyst | M—$SO_2$ | 1.96 | 1.26 |
| Gas Ex. Catalyst | $SO_3 + SO_2$ | 7.00 | 7.00 |
| Recycle to Catalyst | M—$SO_3$ | 0 | 11.48 |
| Recycle to Catalyst | M—$SO_2$ | 0 | 2.52 |
| Recycle to Catalyst | $SO_3 + SO_2$ | 0 | 14.00 |
| Make-up to Catalyst | M—$SO_3$ | 0 | 0 |
| Make-up to Catalyst | M—$SO_2$ | 7.00 | 7.00 |
| Make-up to Catalyst | $SO_3 + SO_2$ | 7.00 | 7.00 |
| Recycle + Make-up | M—$SO_3$ | 0 | 11.48 |
| Recycle + Make-up | M—$SO_2$ | 7.00 | 9.52 |
| Recycle + Make-up | $SO_3 + SO_2$ | 7.00 | 21.00 |
| Conversion to Cat. | (2) | 0 | 54.7 |

(1) Moles ratio $(SO_3 + SO_2)/(SO_3 + SO_2)$
(2) Moles percent $SO_3/(SO_3 + SO_2)$

| Temperature Data | | Conventional Operation | Recycle 2/1 |
|---|---|---|---|
| Recycle/Make-up | (1) | 0 | 2/1 |
| (R + M)/Make-up | (1) | 0 | 3/1 |
| Conversion Ex. Cat | % | 72.0 | 82.0 |
| Equilibrium | °F | 1,140 | 1,070 |
| Equil. Approach | °F | 60 | 60 |
| Gas Ex. Catalyst | °F | 1,080 | 1,010 |
| Make-up Gas Rise | °F | 268 | 306 |
| (R + M)/Make-up | (1) | 1/1 | 3/1 |
| Average Gas Rise | °F | 268 | 102 |
| Gas to Catalyst | °F | 812 | 908 |
| Gas Ex. Catalyst | °F | 1,080 | 1,010 |
| Make-up Gas Rise | °F | 268 | 306 |
| Make-up Gas Rise | 20 F | 812 | 704 |

(1) Moles ratio $(SO_3 + SO_2)/(SO_3 + SO_2)$

| Exchanger Data | | Conventional Operation | Recycle 2/1 |
|---|---|---|---|
| Make-up Gas Temp. | °F | 812 | 704 |
| Cold Make-up Gas | °F | 150 | 150 |
| Exchanger Rise | °F | 662 | 554 |

-continued

| Exchanger Data | | Conventional Operation | Recycle 2/1 |
|---|---|---|---|
| Thermal Requirement | % | 100 | 83.7 |
| Gas Ex. Catalyst | °F | 1,080 | 1,010 |
| Hot Make-up Gas | °F | 812 | 704 |
| Exchanger Delta | °F | 268 | 306 |
| Exchanger Rise | °F | 662 | 554 |
| Rise/Delta | °F | 2.47 | 1.81 |
| Exchanger Surface | % | 100 | 73.3 |

Figure 7:
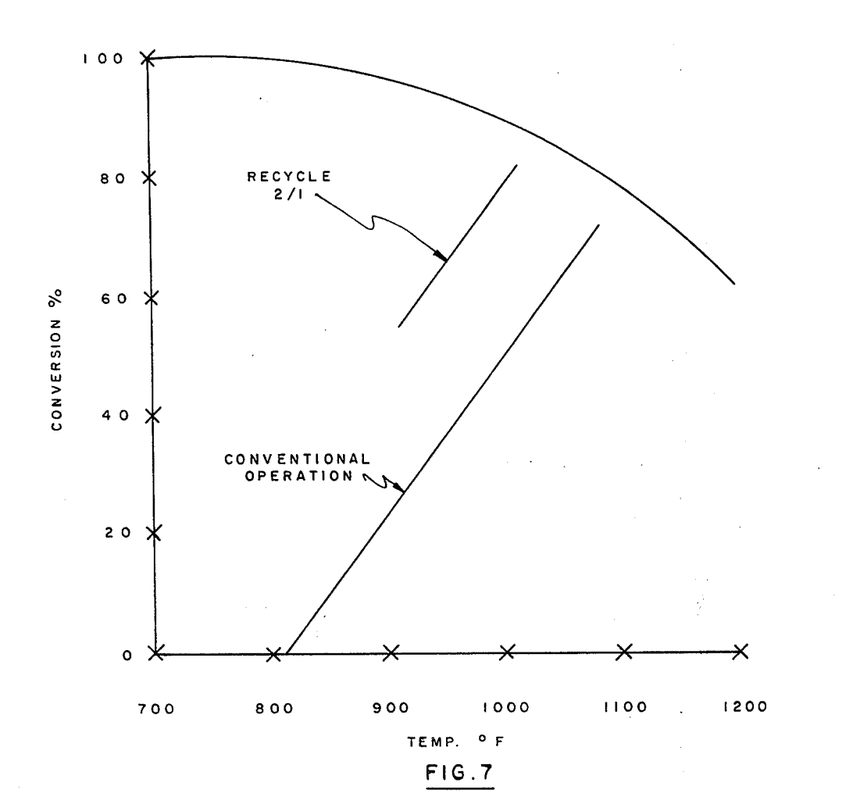

A plot of conversion versus temperature for the system is shown as FIG. 7. The relationships of the respective operating lines for the conventional operation and for the recycle 2/1 may be noted.

An example of application of the present invention to the tail gas from a nitric acid production facility, in order to react residual nitrogen oxides with methane in order to eliminate the nitrogen oxides and thereby prevent air pollution, will now be described.

The invention was applied in computation model to a gas carrying total nitrogen oxides equivalent to 0.4% $NO_2$ plus 2.6% $O_2$ and 97% $N_2$. The catalyst used in the computation model was honeycomb type with minimum inlet temperature of 900°F for maintaining of catalyst ignition and maximum outlet temperature of 1,400°F for avoidance of catalyst deterioration.

Thermal data for the computation model were taken from "JANAF Thermochemical Tables" (Second Edition, June 1971, Office of Standard Reference Data, National Bureau of Standards, Washington, D.C. 20234). The adiabatic temperature rise associated with the use of methane for reduction of the total tail gas 3.0% $O_2$ (The free oxygen 2.6% $O_2$ plus the combined oxygen contained in the 0.4% $NO_2$) over the indicated 900°F to 1,400°F temperature range was determined to be approximately 230°F per each 1.0% total $O_2$ reacted.

The maximum permissible total oxygen content consistent with single-stage catalyst operation within the above temperature limitations was then found from the computation model relationship (1,400–900)/230 to be approximately 2.18% $O_2$. The minimum recycle ratio for the gas with the total 3.0% $O_2$ was in turn found from the relationship 3.0/2.18 to be 1.38 volumes of recycle plus make-up per 1.0 volumes of make-up gas or a recycle/make-up ratio of 0.38/1.0 volume per volume.

The required preheat temperature of the 3.0% total $O_2$ make-up gas in accord with the above constraints was then found from the computation model relationship 1,400 − 3.0 × 230 to be approximately 710°F. The attainment of the limiting 900°F catalyst minimum inlet temperature following mixing of the 1,400°F recycle gas with such 710°F make-up gas and allowing for the recycle/make-up ratio of 0.38/1.0 was verified from the computation model relationship 1,400−(900−710)(1.0/0.38) or thereby meeting the 900°F requirement.

Figure 8:
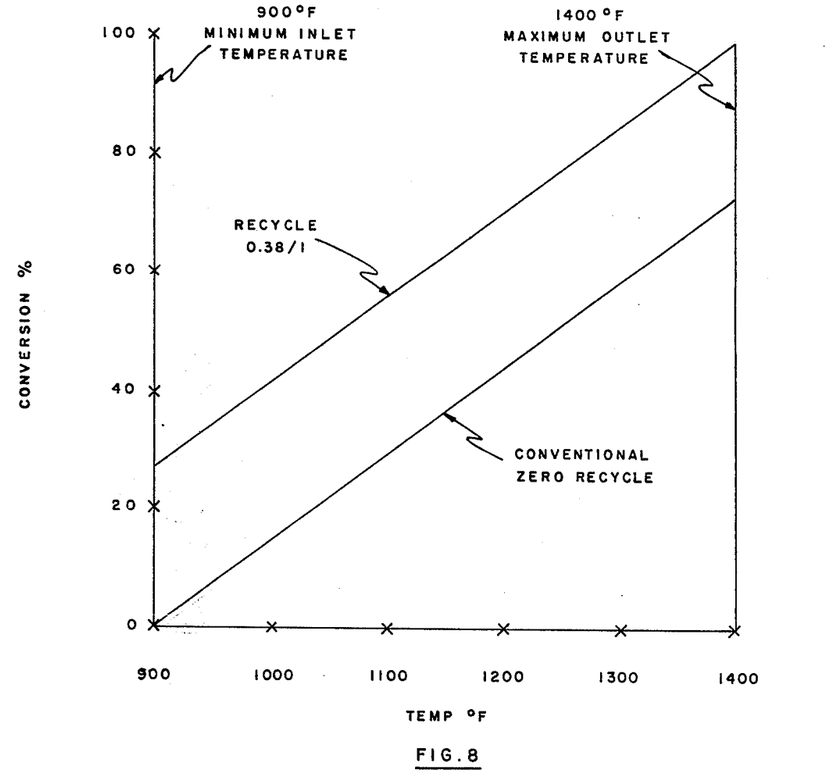

A plot of conversion versus temperature for the system is shown as FIG. 8. The relationships of the respective operating lines for the conventional operation of zero recycle and the above determined recycle ratio of 0.38/1 may be noted. It is clear that within the constraints of the example and for single-stage adiabatic operation that full end gas conversion can be obtained readily with the recycle feature but not at all with the conventional practice. In the case of the 0.38/1 recycle/make-up, the effective conversion of the mixed gas (recycle plus make-up) to the catalyst was found from the computation model relationship (3.0 − 3.0/1.38)/3.0 to be 27.5%.

I claim:

1. A process for the exothermic reaction of a fluid stream which comprises accelerating a cold unreacted feed fluid stream to a high velocity in a constricted fluid flow zone, aspirating a hot recycle fluid stream derived from said exothermic fluid stream reaction into the high velocity cold feed fluid stream, whereby a combined fluid stream is formed at intermediate temperature, passing said combined fluid stream by means of and inside of one or more conduits at least once internally through at least one reaction zone without direct contact with said reaction zone, removing said combined fluid stream from said one or more conduits and passing said combined fluid stream now outside of said one or more conduits again through said at least one reaction zone, reacting said combined fluid stream in said at least one reaction zone, whereby an exothermic reaction takes place in said reaction zone and a hot reacted fluid stream is discharged from said reaction zone, dividing said hot reacted fluid stream into a first portion and a second portion, both of said portions being of identical composition, recycling the first portion of said hot reacted fluid stream as said hot recycle fluid stream, and withdrawing the second portion of said hot reacted fluid stream as a product reacted fluid stream.

2. The process of claim 1, in which said cold feed fluid stream is a gas stream and said reaction zone is a catalytic reaction zone.

3. The process of claim 2, in which said gas stream consists of a combined gas stream including the waste tail gas from a nitric acid production process, together with an added reducing gas, said waste tail gas containing residual nitrogen oxides, whereby said nitrogen oxides are catalytically reduced to elemental nitrogen by reaction with said reducing gas at a temperature in the range of 900°F to 1400°F in said catalytic reaction zone, said waste tail gas initially containing about 0.4% nitrogen oxides, and the recycle ratio of said first portion of hot reacted gas to said feed gas stream being about 0.38:1.0.

4. The process of claim 3, in which said reducing gas is selected from the group consisting of hydrogen, methane and natural gas principally containing methane.

5. The process of claim 1, in which a cold quench fluid stream is added to said combined fluid stream, prior to reacting said combined fluid stream in said reaction zone.

6. The process of claim 5, in which said cold quench fluid stream is a portion of said cold feed fluid stream.

7. The process of claim 1, in which a cold quench fluid in injected into the second portion of said hot reacted fluid stream.

8. A process for the exothermic reaction of a fluid stream which comprises accelerating a cold unreacted feed fluid stream to a high velocity in a constricted fluid flow zone, aspirating a hot recycle fluid stream derived from said exothermic fluid stream reaction into the high velocity cold feed fluid stream, whereby a combined fluid stream is formed at intermediate temperature, passing said combined fluid stream by means of and inside of one or more conduits inside of a reaction vessel from at least one reaction discharge zone to at least one reaction supply zone, removing said combined fluid stream from said one or more conduits and passing said combined fluid stream now outside of said one or more conduits through at least one reaction zone still within said reaction vessel, reacting said combined fluid stream in said at least one reaction zone, whereby an exothermic reaction takes place in said reaction zone and a hot reacted fluid stream is discharged from said reaction zone, dividing said hot reacted fluid stream into a first portion and a second portion, both of said portions being of identical composition, recycling the first portion of said hot reacted fluid stream as said hot recycle fluid stream, and withdrawing the second portion of said hot reacted fluid stream as a product reacted fluid stream.

* * * * *

UNITED STATES PATENT OFFICE
CERTIFICATE OF CORRECTION

PATENT NO. : 3,941,869
DATED : March 2, 1976
INVENTOR(S) : WARREN FUCHS

It is certified that error appears in the above-identified patent and that said Letters Patent are hereby corrected as shown below:

Column 2 line 37, instead of "a" read "at".
Column 6 line 57, instead of "8" read "88".

Column 8 line 60, "2OF" should read -- °F --.

Signed and Sealed this

Twelfth Day of April 1977

[SEAL]

Attest:

RUTH C. MASON
*Attesting Officer*

C. MARSHALL DANN
*Commissioner of Patents and Trademarks*